United States Patent [19]

Kuwada et al.

[11] 3,862,152
[45] Jan. 21, 1975

[54] 3-CARBAMOYLAMINO-4-PHENYL QUINOLINE COMPOUNDS

[75] Inventors: Yutaka Kuwada; Kanji Meguro; Hiroshi Miyano, all of Hyogo, Japan

[73] Assignee: Takeda Chemical Industries, Ltd., Osaka, Japan

[22] Filed: June 23, 1972

[21] Appl. No.: 265,740

[30] Foreign Application Priority Data
July 31, 1971  Japan................................ 46-57704

[52] U.S. Cl.... 260/283 S, 260/283.5 Y, 260/286 R, 260/287 R, 260/288 R, 260/566 F, 424/258
[51] Int. Cl........................................... C07d 33/50
[58] Field of Search...................... 260/287 R, 283 S

[56] References Cited
UNITED STATES PATENTS

| | | | |
|---|---|---|---|
| 2,042,023 | 5/1936 | Schonhofer........................... | 260/41 |
| 2,086,822 | 7/1937 | Schubert et al...................... | 260/125 |
| 2,494,083 | 1/1950 | Bruce................................. | 260/287 |
| 3,247,212 | 4/1966 | Johnson.............................. | 260/288 R |
| 3,819,634 | 6/1974 | Meguro et al..................... | 260/283 S |

OTHER PUBLICATIONS

Neville, et al., Chem. Abstract 59:8715e–g (1965).
Bahner et al., Chemical Abstract 53:20062b (1959).
Dikshoorn, Chemical Abstract 23:19038(1929).
Hanns et al., Chemical Abstract 29:73323(1935).
Hanns, Chemical Abstract 28:17029(1934).

*Primary Examiner*—Donald G. Daus
*Assistant Examiner*—Ralph D. McCloud
*Attorney, Agent, or Firm*—Wenderoth, Lind & Ponack

[57] ABSTRACT

The present invention relates to novel quinoline derivatives, which have an antiulcer action, and also relates to a method for the production thereof.

The present inventors studied quinoline derivatives and succeeded in synthesizing novel quinoline derivatives and further found out that these novel 3-carbamoylamino or thiocarbamoylamino phenylquinolines derivatives have an antiulcer action with low toxicity.

18 Claims, No Drawings

3-CARBAMOYLAMINO-4-PHENYL QUINOLINE COMPOUNDS

The present invention was accomplished on the basis of this finding.

The principal object of the present invention is, thus, to provide novel quinoline derivatives which are useful as medicines such as antiulcer agents. Another object of the present invention is to provide an industrially feasible method for the production of these novel quinoline derivatives.

The object compounds of the present invention are those represented by the following general formula (I);

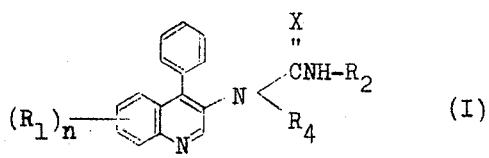

[wherein $R_1$ stands for a hydrogen atom, a lower alkyl group, a lower alkoxy group, a halogen atom, a nitro group or a trifluoromethyl group, $n$ is an integer of 1 to 4, $R_2$ stands for a hydrogen atom, a lower alkyl group, an aryl group which is unsubstituted or substituted by a halogen atom, a nitro or a lower alkyl group, an aralkyl group which is unsubstituted or substituted by a halogen atom, a nitro or a lower alkyl group, or an acyl group represented by the general formula $R_3CO-$ (wherein $R_3$ stands for a lower alkyl group or an aryl group), X stands for an oxygen atom or a sulfur atom, $R_4$ stands for a hydrogen atom or a group represented by the general formula $R_2NHC(=X)-$ (wherein $R_2$ and X have the same meaning as defined above)].

In the following, detailed explanation is made of the present invention.

In the general formula (I), as the lower alkyl groups represented by the symbol $R_1$, those having from 1 to 3 carbon atoms are preferable. The said lower alkyl groups are exemplified by methyl, ethyl, propyl and isopropyl. As the lower alkoxy groups represented by the symbol $R_1$, those having from 1 to 3 carbon atoms are preferable. The said lower alkoxy groups are exemplified by methoxy, ethoxy, propoxy and isopropoxy. The halogen atoms represented by $R_1$ are exemplified by fluorine, chlorine, bromine and iodine.

The lower alkyl groups represented by the symbol $R_2$ may be straight, branched or cyclic ones, and those having 1 to 6 carbon atoms are desirable. The said lower alkyl groups are exemplified by methyl, ethyl, propyl, isopropyl, butyl, isobutyl, tertiary-butyl, pentyl, cyclopentyl, hexyl and cyclohexyl. The aryl groups represented by the symbol $R_2$ may be unsubstituted or substituted by a halogen (e.g. chlorine bromine, fluorine, iodine), a nitro or a lower alkyl group having 1 to 3 carbon atoms (e.g. methyl, ethyl, propyl, isopropyl), and they are exemplified by phenyl, chlorophenyl, nitrophenyl and tolyl. The aralkyl groups represented by the symbol $R_2$ may be unsubstituted or substituted by a halogen (e.g. chlorine, bromine, fluorine, iodine), a nitro or a lower alkyl group having 1 to 3 carbon atoms (e.g. methyl, ethyl, propyl, isopropyl), and they are exemplified by benzyl, chlorobenzyl and phenethyl. The lower alkyl groups and the aryl groups represented by the symbol $R_3$ are exemplified by similar ones to those indicated in respect of the symbol $R_2$, and thus the typical examples of the acyl groups represented by the symbol $R_3CO$ are acetyl, butyryl, benzoyl, etc.

The compounds of the general formula (I) are produced by reacting a compound represented by the general formula (II);

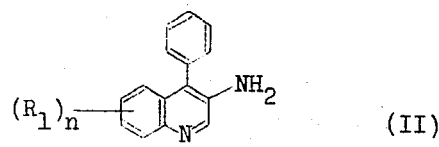

(wherein $R_1$ and $n$ have the same meaning as defined above) with a compound represented by the general formula (III);

(wherein X and $R_2$ have the same meaning as defined above) and, if necessary, hydrolyzing the resulting compound, when $R_2$ is an acyl group represented by $R_3CO-$(wherein $R_3$ has the same meaning as defined above).

It is well known that a compound (III') which corresponds to the compound represented by the general formula (III) wherein $R_3$ is a hydrogen atom is in a state of equilibrium to a compound (III''), and both the compound (III') and the compound (III'') can be used for the method of this invention.

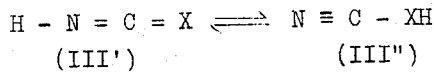

According to the method of this invention, a 3-aminoquinoline derivative (II) is allowed to react with a compound (III). Reaction conditions for using the compound (III) wherein $R_2$ is a hydrogen atom slightly differ from those for using the compound (III) wherein $R_2$ is other than hydrogen atom.

In case of using a compound (III) wherein $R_2$ is a hydrogen atom, it is convenient to introduce it into the reaction system in a form of an alkali metal salt (e.g. sodium salt, potassium salt, etc.) or an ammonium salt, together with an acid (e.g. acetic acid, propionic acid, hydrochloric acid, sulfuric acid, etc.), whereby a free form of the compound (III) is produced in the reaction system. The acid to be used can take a role also as a reaction solvent, but any other inert solvent such as aromatic hydrocarbons (e.g. benzene, toluene, etc.), halogenated hydrocarbons (e.g. chloroform, dichloromethane, tetrachloromethane, etc.), and ethers can also be used. The reaction is generally conducted at 0°C to 30°C, but higher or lower temperatures may also be employed, if necessary.

In case of using a compound (III) wherein $R_2$ is other than a hydrogen atom, the reaction is conducted in the presence of an anhydrous inert solvent such as aromatic hydrocarbons (e.g. benzene, toluene, xylene, etc.), organic bases (e.g. pyridine, picoline, etc.), halogenated hydrocarbons (e.g. chloroform, dichloromethane, tetrachloromethane, etc.) and dimethylformamide. When the compound (III) wherein X is a sulfur atom is used, alcohols (e.g. methanol, ethanol, propanol, etc.) may be useful as a reaction solvent. The reaction is conducted at a temperature ranging from room temperature to a boiling point of the solvent used.

In this reaction, an amount of the compound (III) to be used is about 1 to about 5 moles per mole of the compound (II).

In the method of this invention, under rather mild conditions in respect of reaction temperature, reaction time, etc., the compound (II) generally reacts with the compound (III) in an equimolar ratio to each other to give a compound (I) wherein $R_4$ is a hydrogen atom. On the other hand, when the compound (III) is used in an excess amount and the reaction is conducted under relatively severe conditions such as at a high temperature for a long time, a compound (I) wherein $R_4$ is $R_2NHC(=X)—$ tends to be obtained as a main product, as a result of reaction of 1 mole part of the compound (I) with 2 mole parts of the compound (III).

In addition, in the method of this invention, the compound (I) wherein $R_4$ is $R_2NHC(=X)—$ can be obtained also by conducting the reaction at first under relatively mild conditions to obtain a compound (I) wherein $R_4$ is a hydrogen atom and then allowing the thus obtained compound (I) to react further with the compound (III) under severer conditions. When a mixture of the compound (I) wherein $R_4$ is a hydrogen atom and the compound (I) wherein $R_4$ is $R_2NHC(=X)—$ is produced, the mixture can be separated into each of these compounds (I), which is then purified by per se conventional means such as recrystallization and chromatography.

When the thus obtained compound (I) is one wherein $R_2$ is an acyl group represented by $R_3CO—$, it can be converted by hydrolysis to the compound (I) wherein $R_2$ is a hydrogen atom, if necessary. Usually, this hydrolysis is easily conducted by the use of an aqueous or alcoholic solution of potassium hydroxide or sodium hydroxide in a conventional manner. The resulting compound (I) can be recovered in an optional purity by per se conventional procedures such as filtration, condensation, extraction and recrystallization.

Since the compound (I) contains a basic nitrogen atom in its molecule, it may be converted to a pharmaceutically acceptable organic or inorganic acid salt such as hydrochloride, sulfate, tartrate, succinate and malate. In the above procedure, the object compound is produced in a free form, and thus, upon necessity, this compound is converted to the salt as mentioned above in a conventional manner.

The starting compound (II) can be produced by subjecting a compound represented by the general formula (IV):

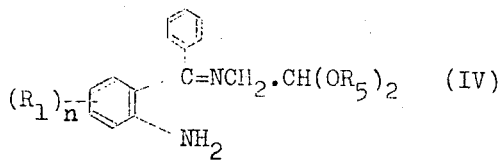

(wherein $R_5$ stands for a lower alkyl group (e.g. methyl, ethyl, etc.), and $R_1$ and n have the same meaning as defined above) to ring closure reaction in the presence of alcoholic hydrogen chloride under reflux, and also by the method described in Journal of Chemical Society 3914(1953) or by methods analogous to the same.

The compounds (I) or their pharmaceutically acceptable salts have an antiulcer action, with low toxicity. These compounds can treat effectively ulcers of various types (e.g. gastric ulcer, duodenal ulcer, intestinal ulcer, etc.) and, furthermore, they can prevent ulcers, particularly those caused by anti-inflammatory agents. Therefore, it is recommended to administer anti-inflammatory agents (e.g. phenylbutazone, indomethacine, ibufenac, etc.) together with the present compound in order to prevent ulcers caused by the anti-inflammatory agents.

By virtue of these actions, the compounds (I) and their pharmaceutically acceptable salts are used as medicines such as antiulcer agent or preventive medicines against ulcers, particularly those caused by anti-inflammatory agents. When these compound are employed as antiulcer agents and/or medicines for treating or preventing ulcers, particularly those caused by anti-inflammatory agents, they are administered in per se or in the form of a pharmaceutically acceptable composition in admixture with a suitable and conventional carrier or adjuvant. The pharmaceutical composition may take the form of tablets, granules, powders, capsules, liquids, injections, and may be administered orally or parenterally.

As an antiulcer agent or preventive medicine against ulcers, particularly, those caused by anti-inflammatory agents, usual daily dosage of the present compounds lies in the range of 20 mg. to 1 g. per adult human.

Some examples of practical compositions in which the compounds of this invention are utilized as remedies for ulcers are as follows:

| Tablets: | 3-carbamoylamino-6-chloro-4-phenylquinoline | 20 weight parts |
|---|---|---|
| | lactose | 140 weight parts |
| | hydroxypropylcellulose | 8 weight parts |
| | magnesium stearate | 2 weight parts |
| | corn starch | 60 weight parts |
| | | 230 milligrams per tablet |
| Capsules: | 6-chloro-3-methylcarbamoyl-amino-4-phenylquinoline | 20 weight parts |
| | lactose | 110 weight parts |
| | corn starch | 80 weight parts |
| | hydroxy propylcellulose | 8 weight parts |
| | magnesium stearate | 2 weight parts |
| | | 220 milligrams per capsule |

For further explanation of the present invention, the following examples are given, wherein "part(s)" is based on weight unless otherwise noted and the relationship between "part(s)" and "part(s) by volume" corresponds to that between "gram(s)" and "milliliter(s)".

EXAMPLE 1

To a solution of 10.2 parts of 3-amino-6-chloro-4-phenylquinoline in 150 parts by volume of acetic acid is added dropwise a solution of 9.75 parts of potassium cyanate in 36 parts by volume of water under stirring at room temperature, followed by stirring for further 1 hour. To the mixture is added 150 parts by volume of water, and then precipitates are recovered by filtration, whereby 3-carbamoylamino-6-chloro-4- phenylquinoline is obtained as crystals. Recrystallization from ethanol gives pale pink plates melting at 207°–208°C.

| Elementary analysis $C_{16}H_{12}ClN_3O$ | |
|---|---|
| Calculated | C 64.54, H 4.06, N 14.11 |
| Found | C 64.34, H 4.10, N 13.85 |

EXAMPLE 2

To a solution of 2.55 parts of 6-chloro-3-amino-4-phenylquinoline in 50 parts of benzene is added 2 parts by volume of methyl isocyanate, and the mixture is refluxed for 15 hours. The solution is concentrated under reduced pressure, whereby 6-chloro-3-methylcarbamoylamino-4-phenylquinoline is obtained as colorless crystals. Recrystallization from methanol gives colorless plates melting at 229°–231°C.

| Elementary analysis $C_{17}H_{14}ClN_3O$ | |
|---|---|
| Calculated | C 65.49, H 4.53, N 13.48 |
| Found | C 65.37, H 4.70, N 13.56 |

EXAMPLE 3

To a solution of 26.5 parts of 3-amino-6-nitro-4-phenylquinoline in 700 parts by volume of benzene is added 75 parts by volume of methyl isocyanate, and the mixture is refluxed for 24 hours. The solution is concentrated to about one-third by volume under reduced pressure. The precipitates are recovered by filtration and washed with benzene to give 3-(bis-methylcarbamoyl)amino-6-nitro-4-phenylquinoline as colorless crystals. Recrystallization from ethyl acetate gives pale yellow prisms melting at 205°–206°C (decomposition).

| Elementary analysis $C_{19}H_{17}N_5O_4$ | |
|---|---|
| Calculated | C 60.15, H 4.52, N 18.46 |
| Found | C 60.07, H 4.37, N 18.20 |

EXAMPLE 4

To a solution of 2.55 parts of 3-amino-6-chloro-4-phenylquinoline in 50 parts by volume of ethanol is added 2.92 parts of methyl isothiocyanate, and the mixture is refluxed for 17 hours. The solution is concentrated under reduced pressure, and then the residue is treated with ether, whereby 6-chloro-3-methylthiocarbamoylamino-4-phenylquinoline is obtained as colorless crystals. Recrystallization from benzene gives colorless hairy crystals melting at 191°–192°C.

| Elementary analysis $C_{17}H_{14}ClN_3S$ | |
|---|---|
| Calculated | C 62.29, H 4.30, N 12.82 |
| Found | C 62.31, H 4.28, N 12.70 |

EXAMPLE 5

To a solution of 0.17 part of ammonium thiocyanate in 2 parts by volume of acetone is added 0.28 part of benzoyl chloride, and the mixture is refluxed for 10 minutes to give a solution of benzoyl thiocyanate. To this is added a solution of 0.51 part of 3-amino-6-chloro-4-phenylquinoline in 10 parts by volume of acetone, and then the mixture is refluxed for 40 minutes. The mixture is concentrated under reduced pressure, and the residue is washed with water and then with ethanol, whereby 3-benzoylthiocarbamoylamino-6-chloro-4-phenylquinoline is obtained as crystals. Recrystallization from ethyl acetate gives pale yellow plates melting at 203°–205°C.

| Elementary analysis $C_{23}H_{16}ClN_3OS$ | |
|---|---|
| Calculated | C 66.12, H 3.86, N 10.06 |
| Found | C 66.39, H 3.85, N 9.95 |

EXAMPLE 6

To 0.84 part of 3-benzoylthiocarbamoylamino-6-chloro-4-phenylquinoline obtained in Example 5 is added 3 parts by volume of a 10% aqueous sodium hydroxide solution, and the mixture is refluxed for 10 minutes. The resulting solution is acidified by the addition of hydrochloric acid under ice-cooling, and then to the mixture is added an aqueous ammonia solution for adjusting the solution to weak alkali. The resulting precipitate is recovered by filtration to give 6-chloro-4-phenyl-3-thiocarbamoylaminoquinoline as colorless crystals. Recrystallization from ethanol gives colorless hairy crystals melting at 207°–208°C.

| Elementary analysis $C_{16}H_{12}ClN_3S$ | |
|---|---|
| Calculated | C 61.24, H 3.86, N 13.39 |
| Found | C 61.07, H 3.91, N 13.22 |

In a similar manner to the above Examples, various compounds are produced.

The results are in Table 1.

Table 1

| Starting compound | | End product | Recrystallizing solvent/ Crystal form | Melting Point (°C) |
|---|---|---|---|---|
| 3-amino-6-nitro-4-phenylquinoline | potassium cyanate | 3-carbamoylamino-6-nitro-4-phenyl-quinoline | methanol/ yellow plates | 204 – 205 (decomposition) |
| 3-amino-6-methyl-4-phenylquinoline | potassium cyanate | 3-carbamoylamino-6-methyl-4-phenyl-quinoline | ethyl acetate/ colorless plates | 216 – 217 |
| 3-amino-6-methyl-4-phenylquinoline | methyl isocyanate | 6-methyl-3-methyl-carbamoylamino-4-phenylquinoline | ethyl acetate/ colorless crystals | 227 – 228 |
| 3-amino-6-chloro-4-phenylquinoline | phenyl isocyanate | 6-chloro-4-phenyl-3-phenylcarbamoyl-aminoquinoline | ethyl acetate/ colorless powdery crystals | 184 – 185 |

Table 1—Continued

| Starting compound | End product | | Recrystallizing solvent/ Crystal form | Melting Point (°C) |
|---|---|---|---|---|
| 3-amino-6-chloro-4-phenylquinoline | p-chlorophenyl isocyanate | 6-chloro-3-(p-chlorophenyl-carbamoyl)amino-4-phenylquinoline | chloroform/ colorless powdery crystals | 224 – 225 |
| 3-amino-6,7-dimethoxy-4-phenylquinoline | benzyl isocyanate | 3-benzylcarbamoyl-amino-6,7-dimethoxy-4-phenylquinoline | aqueous ethanol/ colorless powdery crystals | 96 – 97 |

In a similar manner to the above, the following compounds are produced.
3-carbamoylamino-4-phenylquinoline
3-methylcarbamoylamino-4-phenylquinoline
3-carbamoylamino-6-methoxy-4-phenylquinoline
3-phenylcarbamoylamino-4-phenylquinoline
3-carbamoylamino-6,7-dimethoxy-4-phenylquinoline
3-carbamoylamino-6,7-dimethyl-4-phenylquinoline
3-carbamoylamino-6-trifluoromethyl-4-phenylquinoline
3-(isobutyl)carbamoylamino-6-chloro-4-phenylquinoline
3-cyclohexylcarbamoylamino-6-methyl-4-phenylquinoline
3-hexylcarbamoylamino-6-methyl-4-phenylquinoline
6-methyl-3-(p-nitrophenyl)carbamoylamino-4-phenylquinoline
6-chloro-4-phenyl-3-(p-tolyl)carbamoylaminoquinoline
3-(p-chlorobenzyl)carbamoylamino-6-methyl-4-phenylquinoline
6-methyl-3-(p-nitrobenzyl)carbamoylamino-4-phenylquinoline
6-chloro-3-(p-methylbenzyl)carbamoylamino-4-phenylquinoline
3-acetylcarbamoylamino-6-chloro-4-phenylquinoline

What we claim is:

1. A compound of the formula:

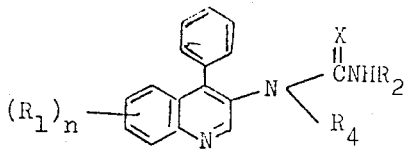

wherein:
$R_1$ : hydrogen, methyl, methoxy, halogen, nitro or trifluoromethyl
$n$ : 1 except when $R_1$ is methoxy and 2 when $R_1$ is methoxy
$R_2$ : hydrogen, methyl, benzyl, benzoyl, phenyl or para chlorophenyl
X : oxygen or sulfur
$R_4$ : hydrogen or methylcarbamoylamino.

2. A compound as claimed in claim 1, wherein $R_1$ is methyl, halogen or nitro.
3. A compound as claimed in claim 1, wherein $R_4$ is carbamoylamino and X is an oxygen or sulfur.
4. A compound as claimed in claim 1, wherein $R_4$ is a hydrogen atom.
5. A compound as claimed in claim 1, wherein X is an oxygen atom.
6. A compound as claimed in claim 1, wherein X is a sulfur atom.
7. A compound as claimed in claim 1, wherein the compound is 3-carbamoylamino-6-chloro-4-phenylquinoline.
8. A compound as claimed in claim 1, wherein the compound is 3-carbamoylamino-6-nitro-4-phenylquinoline.
9. A compound as claimed in claim 1, wherein the compound is 3-carbamoylamino-6-methyl-4-phenylquinoline.
10. A compound as claimed in claim 1, wherein the compound is 6-chloro-3-methylcarbamoylamino-4-phenylquinoline.
11. A compound as claimed in claim 1, wherein the compound is 6-methyl-3-methylcarbamoylamino-4-phenylquinoline.
12. A compound as claimed in claim 1, wherein the compound is 3-(bis-methylcarbamoyl)amino-6-nitro-4-phenylquinoline.
13. A compound as claimed in claim 1, wherein the compound is 6-chloro-4-phenyl-3-phenylcarbamoylaminoquinoline.
14. A compound as claimed in claim 1, wherein the compound is 6-chloro-3-(p-chlorophenylcarbamoyl)amino-4-phenylquinoline.
15. A compound as claimed in claim 1, wherein the compound is 6-chloro-3-methylthiocarbamoylamino-4-phenylquinoline.
16. A compound as claimed in claim 1, wherein the compound is 3-benzoylthiocarbamoylamino-6-chloro-4-phenylquinoline.
17. A compound as claimed in claim 1, wherein the compound is 6-chloro-4-phenyl-3-thiocarbamoylaminoquinoline.
18. A compound as claimed in claim 1, wherein the compound is 3-benzylcarbamoylamino-6,7-dimethoxy-4-phenylquinoline.

* * * * *